3,475,509
PROCESS FOR PRODUCING NON-CONJUGATED
DIENES
Go Hata and Akihisa Miyake, Kamakura-shi, Japan, assignors to Toyo Rayon Kabushiki Kaisha, Chuo-ku, Tokyo, Japan, a corporation of Japan
No Drawing. Filed Sept. 15, 1967, Ser. No. 668,213
Claims priority, application Japan, Sept. 19, 1966, 41/61,479; Oct. 3, 1966, 41/64,844
Int. Cl. C07c 11/12
U.S. Cl. 260—680    22 Claims

ABSTRACT OF THE DISCLOSURE

A process for producing non-conjugated dienes which comprises reacting conjugated diolefinic hydrocarbons with ethylene in the presence of a catalyst consisting of iron complexes of diphosphine or iron complexes of diphosphine and organoaluminum compounds. The iron complexes of diphosphine are selected from those represented by the general formula:

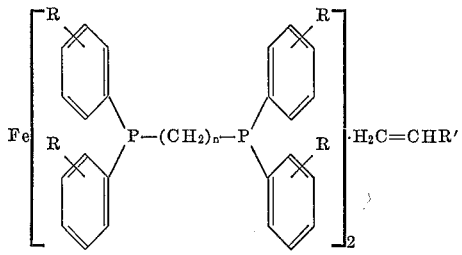

wherein R is a hydrogen atom, a methyl group, or an ethyl group; $n$ stands for 2 or 3; and R' is a hydrogen atom or a hydrocarbon group having 1 to 6 carbon atoms; and complexes of the formula:

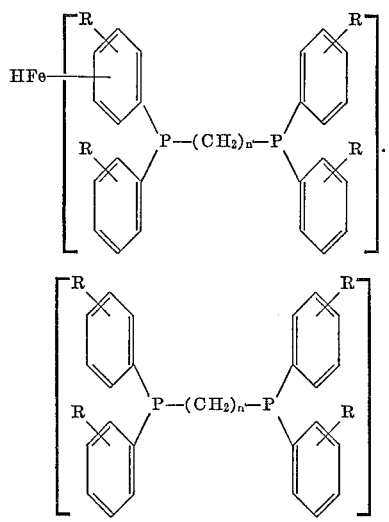

wherein R and $n$ are as defined above.

---

The present invention relates to a process for producing nonconjugated dienes by addition reaction of conjugated diolefinic hydrocarbons to ethylene.

More particularly, the present invention relates to a process for producing non-conjugated dienes which comprises reacting conjugated diolefinic hydrocarbons with ethylene in the presence of a catalyst consisting of iron complexes of diphosphine or iron complexes of diphosphine and organoaluminum compounds.

The non-conjugated hydrocarbons, for instance, 1,4-hexadiene, 5-alkyl-1,4-hexadiene and 3-alkyl-1,4-hexadiene, are compounds having various valuable uses as intermediates. Recently, 1,4-hexadienes have been attracting attention particularly as a third component for imparting sulfur vulcanizability to an ethylene-propylene copolymer, a so-called ethylene-propylene rubber.

However, most of the processes for producing non-conjugated dienes not only required a great number of processing steps, but also the cost of the starting material was high. Thus, the economic value of these processes was low. Recently, there is disclosed in French Patent 1,319,578 a process of producing hexadienes from ethylene or propylene and butadiene. The catalyst used in this process, however, is a very costly one such as rhodium trichloride, and hence the cost of production becomes inevitably high.

As a result of extensive studies about a process for effectively achieving said addition reaction, the present inventors have succeeded in developing a catalyst capable of producing non-conjugated dienes with high selectivity and at high yield, thereby having reached the present invention.

The catalyst used in the process of the present invention is an iron complex of diphosphine represented by the general formula

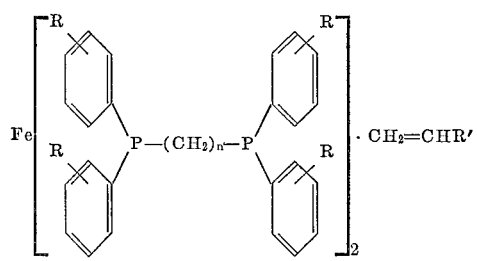

(wherein R stands for hydrogen atom, methyl group or ethyl group, $n$ stands for 2 or 3, and R' stands for hydrogen atom or a hydrocarbon group having 1 to 6 carbon atoms), or an iron complex of diphosphine represented by the general formula

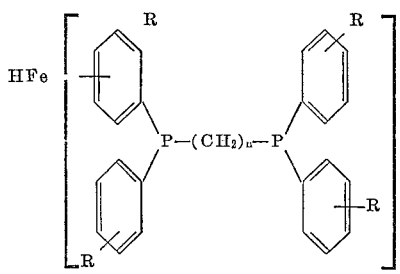

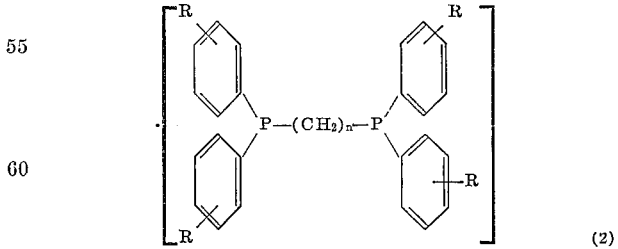

(Wherein R and $n$ are the same as defined above), wherein α-olefin is eliminated from the diphosphine complex shown in Formula 1 and one hydrogen atom of an aromatic nucleus of a ligand transfers to an iron atom.

As an iron complex of diphosphine especially preferably used in the process of the present invention, an iron complex of 1,2-bis-(diphenylphosphino)ethane of the following formula may be cited.

Fe[(C₆H₅)₂PCH₂CH₂P(C₆H₅)₂]₂·C₂H₄ or

HFe[(C₆H₄)(C₆H₅).PCH₂CH₂P(C₆H₅)₂]
.[(C₆H₅)₂PCH₂CH₂P(C₆H₅)₂]

The iron complexes of diphosphine represented by the above Formulae 1 and 2 are novel substances which have been synthesized by the present inventors for the first time and process for producing them will be described in detail later.

A more highly active catalyst used in the process of the present invention is the one obtained by mixing the iron complexes of diphosphine represented by the above general formulae with organoaluminum compounds.

An organoalumium compound as herein referred to is an alkylaluminum and an alkyl aluminum halide. Especially, organoaluminum compounds represented by general formulae R″₃Al, A″₂AlX, R″₃Al₂X₃ and R″AlX₂, (wherein R″ stands for an alkyl group having 1–8 carbon atoms and X stands for a halogen atom) are preferably used. As examples thereof, triethylaluminum, trisobutylaluminum, diethylaluminum chloride, di-n-propylaluminum chloride, diisobutylaluminum chloride, ethylaluminum sesquichloride, ethylaluminum sesquibromide, ethylaluminum dichloride and n-hexylaluminum dichloride may be cited.

The process of the present invention comprises contacting, in the presence of a catalyst consisting of the said iron complex of diphosphine or a catalyst consisting of the said iron complex of diphosphine and the said organoaluminum compound, conjugated diolefinic hydrocarbons with ethylene to prepare non-conjugated dienes wherein ethylene is added to a carbon atom at position 1 or 4 of the said conjugated diolefinic hydrocarbon.

The conjugated diolefinic hydrocarbons as hereinabove referred to are unsubstituted or substituted 1,3-butadiene represented by the general formula

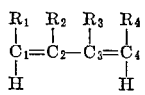

(wherein R₁, R₂, R₃ and R₄ stand for hydrogen atom or a hydrocarbon group having 1 to 6 carbon atoms).

As examples of conjugated diolefinic hydrocarbons especially preferably used, 1,3-butadiene, 2-methyl-1,3-butadiene, 2,3-dimethyl-1,3-butadiene, 1,4-dimethyl-1,3-butadiene, 2,4-dimethyl-1,3-butadiene, and 2-phenyl-1,3-butadiene may be cited.

There are two modes of addition of ethylene to the said conjugated diolefinies. One is a case where one hydrogen atom of ethylene is bonded to a carbon atom at position 1 or 4 of the said conjugated diolefinic hydrocarbon and the remaining vinyl group is bonded to another terminal carbon, in which case 1,4-dienes are produced; the other being a case where one hydrogen atom of ethylene is bonded to a carbon atom at position 2 or 3 and the remaining vinyl group is bonded to a carbon atom doubly bonded to the said carbon atom, in which case 1,5-dienes are produced.

(1)
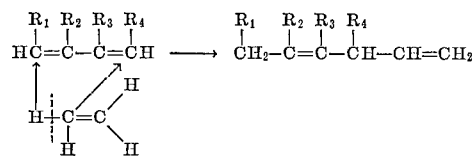

(2)
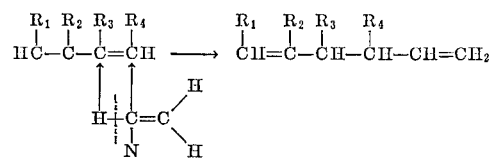

In cases where mono-substituted conjugated diolefins are involved, it can be said that ethylene is apt to attach that terminal carbon atom which has a substituent rather than that without a substituent.

An amount of the catalyst used is an ordinary one, the so-called catalytic amount will suffice. In case of using an iron complex of diphosphine alone, it is preferable to use it in an amount of 0.01 to 1 mol percent based on the said conjugated diolefinic hydrocarbons. In a binary catalyst consisting of an iron complex of diphosphine and an organoaluminum compound, a small amount of the iron complex of diphosphine suffices and it is preferable to use it in an amount of 0.00001 to 0.01 mol percent based on the said conjugated diolefinic hydrocarbons.

In cases where a binary catalyst consisting of an iron complex and an organoaluminum compound is used, there is no particular limitation concerning the ratio of the two components. However, ordinarily it is preferable to use the organoaluminum compound in an amount of 1 to 50 mols based on 1 mol of the iron complex. In cases where the said organoaluminum compound is R″₃Al₂X₃ or R″AlX₂, 1 to 4 mols are particularly preferable, and in cases where the said organoaluminum compound is R″₂AlX or R″₃Al at least 4 mols are particularly preferable.

It is operationally convenient to dissolve catalyst components in an organic solvent which is inert to the catalyst, for instance, benzene, toluene, xylene, etc. In the case of a binary catalyst, a particularly high catalytic activity is obtained, when mixing of the two components is carried out in which is itself one of the reactants, a conjugated diolefinic hydrocarbon.

As to the contact temperature of the present invention, a range of 0°–150° C., especially, 40°–100° C. is preferable. Also it is preferable to carry out the reaction under pressure of ethylene. Especially when the reaction is carried out under ethylene pressure of 20–60 kg./cm.², the reaction proceeds fast.

The desired non-conjugated dienes can be synthesized by the invention process by suitably varying the conditions within the ranges indicated hereinabove of the present invention. For example, the relationship between the kinds of the conjugated diolefinic hydrocarbons used and the resulting non-conjugated dienes is, in general, as follows.

(1) 1,3-butadiene→1,4-hexadiene, 1,5-hexadiene
(2) 2-alkyl-1,3-butadiene→5-alkyl-1,4-hexadiene, 4-alkyl-1,4-hexadiene
(3) 4-alkyl-1,3-butadiene→3-alkyl-1,4-hexadiene, 6-alkyl-1,4-hexadiene, 3-alkyl-1,5-hexadiene
(4) 2,3-dialkyl-1,3-butadiene→4,5-dialkyl-1,4-hexadiene
(5) 2,4-dialkyl-2,4-hexadiene→4,6-dialkyl-1,4-hexadiene, 3,5-dialkyl-1,4-hexadiene
(6) 1,4-dialkyl-1,3-butadiene→3,6-dialkyl-1,4-hexadiene
(7) 2-phenyl-1,3-butadiene→4-phenyl-1,4-hexadiene In accordance with the process of the present invention, from a conjugated diolefine and ethylene, a non-conjugated diene is obtained in a high yield.

Also by combining the iron complexes of diphosphine with the said organoaluminum compounds, it is possible to produce 1,4-dienes with a very high selectivity (above 95%), which can be maintained even at very high conversion (above 95%) of the conjugated diolefines. Such a high selectivity as observed in the catalyst system of this invention has never been expected from the conventional catalysts. Namely, in the method of U.S. Patent 3,152,-195 (British Patent 948,041) using rhodium chloride as a catalyst, the selectivity of production of 1,4-dienes is about 85%, while in French Patent 1,388,305 using a nickel-phosphine complex, the selectivity is only 80%.

Furthermore, they have disadvantages in that the selectivity is remarkably lowered when the conversion of the conjugated diolefins is raised. Thus, the above-described selectivity of the catalyst according to the said U.S. patent is attainable at the conversion below 60%, and that of the catalyst according to the said French patent only at the conversion below 25%. According to the method described in the said French patent, for example, the selectivity is as low as 19% at the conversion of 35%. In each of the conventional catalyst systems hereinabove described, the amount of a by-product, 2,4-hexadiene, increases and the selectivity in 1,4-hexadiene formation is lowered, when the conversion is raised further.

Next, an explanation will be made with reference to the iron complexes of diphosphine represented by the said Formula 1 or 2 which are used as catalyst or catalyst component in the present invention. These complexes are novel substances which have been synthesized by the present inventors for the first time, and processes for preparing the same will be described below.

The said iron complexes of diphosphine may be prepared by the reaction of a divalent or trivalent iron compound with an alkylaluminum compound in the presence of a diphosphine represented by the general formula

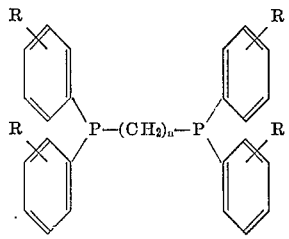

(wherein R and $n$ are the same as defined above) and an α-olefine represented by the general formula $CH_2=CHR'$ (wherein R' is the same as defined above).

As typical examples of the starting diphosphines, 1,2-bis(diphenylphosphino)ethane, 1,3-bis(diphenylphosphino)propane and 1,2-bis(ditolylphosphino)ethane may be cited.

As examples of the said α-olefins, ethylene, propylene, 1-butene, 1-pentene, 1-hexene and styrene may be cited, of which ethylene is the most preferably used.

As the iron compound, a compound having an iron-oxygen bond is preferably used. Especially, a chelated iron compound of β-diketones such as iron (II) acetyl acetonate, iron (III) acetylacetonate and iron (III) benzoylacetylacetonate, a chelated iron compound of a ketocarboxylic acid ester such as iron (III) ethylacetoacetate and an iron carboxylate such as ferric formate, ferrous acetate, ferric acetate and ferric dimethoxyacetate may be cited.

An alkylaluminum compound is used for the reduction of the said iron compounds. As such a compound, the compounds wherein at least two alkyl groups are directly bonded to the aluminum atom, namely, $R''''OAlR'''_2$, $AlR'''_3$ and $MAlR'''_4$ (wherein R''' and R'''' stand for an alkyl group having 1 to 8 carbon atoms and M stands for an alkali metal) are used. As typical examples of such an organoaluminum compound, an alkoxydialkyl aluminum such as ethoxydiethylaluminum, ethoxydiisobutylaluminum, and alkoxydialkyl and butoxydiethylaluminum; a trialkylaluminum such as triethylaluminum, diethylisobutylaluminum and triisobutylaluminum; and tetraethylaluminum sodium may be cited.

When the said starting materials are mixed and contacted, the desired complex can easily be obtained.

In this case, it is preferable to contact an iron component with an organoaluminum compound in the presence of a diphosphine. Otherwise, the desired complex cannot be preferably obtained, because a reduced iron cannot remain stable.

As a reaction medium, an inert solvent, such as benzene, toluene and diethyl ether are preferably used. The reaction is carried out in the presence of an α-olefin preliminarily dissolved in these solvents or while passing the α-olefin through a solution of the reaction vessel.

In case where an alkyl aluminum compound with at least one straight-chain alkyl group of 2 to 8 carbon atoms directly bonded to an aluminum atom is used, an α-olefine having the corresponding number of carbon atoms is sometimes produced during the reaction depending upon the reaction conditions. In that case, the preliminary presence of an α-olefine in the reaction vessel is not requisite.

As to the reaction temperature of preparing the catalyst, a range of −30° C. to 150° C., especially −5° C. to 80° C. is preferable.

With reference to the ratio of the starting materials, there is no particular limitation, but the molar ratio of 1 to 4, especially a stoichiometric amount of about 2 mols of diphosphine per mol of the iron compound is preferable, and a range of molar ratio of an organoaluminum based on an iron compound is 1 to 50, especially 3 to 10 is preferable.

At reaction temperatures below 60° C., an iron complex having the said general Formula 1 is obtained, while above 60° C. an iron complex having the said general Formula 2 is obtained. In order to obtain the iron complex of the said Formula 2 in a good yield, it is preferable to mix the said starting materials at a temperature below 40° C. and then to heat the reaction mixture to 60–100° C. However, the separated complex having the said general Formula 1 does not convert into an iron complex having the general Formula 2 at this temperature range. The iron complex of the said general Formula 2 may be easily obtained also by irradiating the iron complex of the said general Formula 1 with ultraviolet ray.

The iron-diphosphine complexes prepared by such methods are all crystalline solids and very unstable in the air. Therefore, preparation of the said iron complexes is ordinarily carried out under the non-oxidizing atmosphere.

Next, the present invention will be explained in further detail with reference to examples. However, it should be noted that the present invention will not be limited to these examples.

EXAMPLE 1

(1) Production of
$Fe[(C_6H_5)_2PCH_2CH_2P(C_6H_5)_2]_2 \cdot C_2H_4$

Into a 500 cc. 3-necked flask, the air inside of which was replaced by argon, 11.9 g. (0.030 mol) of powdery 1,2-bis(diphenyl phosphino) ethane, 5.3 g. (0.015 mol) iron (III) acetyl acetonate and 250 cc. of ethyl ether (whose moisture and air were completely removed) were charged. Next, 15 cc. of ethoxydiethylaluminum was dissolved in 100 cc. of ethyl ether and the mixed solution was gradually added dropwise to the said flask with stirring. The period required for dropping was 2.5 hours. When the entire mixture was further stirred at 0° C. for 30 minutes and at room temperaturre for 1 hour, violet crystals were separated, which were filtered and washed with ether. As a result, 11.2 g. of

was obtained. The melting point of the product was 170° C. (decomposition).

The product was identified as

as follows.

Elemental analysis calculated value: C, 73.64; H, 5.95. Observed value: C, 73.58, H, 6.03.

It reacted with 1 mol of iodine to give

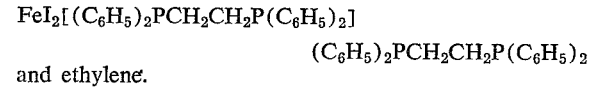

and ethylene.

(2) Production of a non-conjugated diene

Into a 100 cc. autoclave 30 cc. of toluene, 0.440 g. of

obtained above and 26 cc. of liquified butadiene were charged, and the resultant mixture was stirred at 85° C. under ethylene pressure of 40 kg./cm.² for 6 hours. As a result, 2.3 g. of 1,5-hexadiene, 2.6 g. of 1,4-hexadiene, 1.4 g. of 1,3-hexadiene, 1.4 g. of 2,4-hexadiene and 7.7 g. of diene having 8 carbon atoms were obtained.

EXAMPLE 2

Into a 100 cc. autoclave, 30 cc. of benzene, 0.440 g. of

Fe[(C₆H₅)₂PCH₂CH₂P(C₆H₅)₂]₂·C₂H₄ and 24.6 g. of 1,3-hexadiene were charged and while keeping pressure of ethylene at 40 kg./cm.², the entire mixture was stirred at 85° C. for 6 hours. As a result, 5.8 g. of diene having 8 carbon atoms, containing 2.6 g. of 3-methyl-1,5-heptadiene was obtained.

EXAMPLE 3

Into 50 cc. of diethyl ether, 0.35 g. of iron (III) acetylacetonate and 0.8 g. of 1,2-bis(diphenyl phosphino) ethane were suspended, while passing an ethylene gas, 1.55 cc. of ethoxydiisobutylaluminum dissolved in 20 cc. of ether was added thereto. As a result 0.4 g. of Fe[(C₆H₅)₂PCH₂CH₂P(C₆H₅)₂]₂·C₂H₄ was obtained, which identified by the same method as described in Example 1.

Into a 100 cc. autoclave, 26 cc. of liquefied butadiene was charged to which 0.44 g. of Fe[(C₆H₅)₂PCH₂CH₂P(C₆H₅)₂]₂·C₂H₄ obtained by the aforementioned process dissolved in 10 cc. of toluene was added. Further, 8 cc. (8 mmol) of a toluene solution of (C₂H₅)₂AlCl was added thereto. The entire mixture was heated to 50° C. and while keeping the pressure of ethylene at 40 kg./cm.², stirring was continued for 30 minutes. As a result 21.2 g. of 1,4-hexadiene was produced. The reaction residue was 0.7 g. Conversion: 93.10 (mol) percent. Selectivity: 96.30 (mol) percent.

EXAMPLE 4

Into a 100 cc. autoclave, 30 cc. of toluene, 0.440 g. of

Fe[(C₆H₅)₂PCH₂CH₂P(C₆H₅)₂]₂·C₂H₄

16.4 g. (0.2 mol) of 2,4-hexadiene and 2 cc. of a toluene solution containing 2 mmols of triethylaluminum were charged. Ethylene was introduced up to a pressure of 40 kg./cm.² and the entire mixture was stirred at 80° C. for 6 hours. As a result, 5.8 g. of 3-methyl-1,4-heptadiene was obtained.

EXAMPLE 5

Into a 100 cc. autoclave, 20 cc. of toluene, 0.440 g. of

Fe[(C₆H₅)₂PCH₂CH₂P(C₆H₅)₂]₂·C₂H₄

24.6 g. of 2,3-dimethyl-1,3-butadiene and 4 cc. of a toluene solution containing 4 mmols of diethylaluminum chloride were charged. The pressure of ethylene was kept at 40 kg./cm.² and the entire mixture was stirred at 80° C. for 1 hour. As a result, 33.0 g. of 4,5-dimethyl-1,4-hexadiene was obtained. Conversion: 100 (mol) percent. Selectivity: 98 (mol) percent.

EXAMPLE 6

Into a 100 cc. autoclave, 20 cc. of toluene, 0.440 g. of

Fe[(C₆H₅)₂PCH₂CH₂P(C₆H₅)₂]₂·C₂H₄

14.5 g. of 4-methyl-1,3-pentadiene and 4 cc. of a toluene solution containing 4 mmols of diethylaluminum chloride were charged. An ethylene gas was introduced up to a pressure of 40 kg./cm.² and the entire mixture was stirred at 80° C. for 1 hour. As a result, 16.1 g. of 3,5-dimethyl-1,4-hexadiene and 1.4 g. of 4-methyl-1,4-heptadiene were obtained. Conversion: 95 (mol) percent. Selectivity: 95 (mol) percent.

EXAMPLE 7

Production of

Fe[(C₆H₅)₂PCH₂CH₂CH₂P(C₆H₅)₂]₂·C₂H₄

Into a 200 cc. 3-necked flask, 4.1 g. of powdery 1,3-bis (diphenylphosphino) propane, 1.8 g. of iron (III) acetylacetonate and 100 cc. of diethyl ether were charged. Next, 5 cc. of ethoxydiethylaluminum dissolved in 30 cc. of ether was added to the flask with stirring. The temperature during the addition was kept at 0° C. A red precipitate separated, which was filtered and washed well with ether. As a result, 1.4 g. of Fe[(C₆H₅)₂PCH₂CH₂CH₂P(C₆H₅)₂]₂·C₂H₄ was obtained.

Element analysis: Calculated values C, 74.00; H, 6.16. Observed values C, 74.26; H, 6.27.

Into a 100 cc. autoclave, 26 cc. of liquefied butadiene was charged to which 0.447 g. of Fe[(C₆H₅)₂PCH₂CH₂CH₂P(C₆H₅)₂]₂·C₂H₄ dissolved in 20 cc. of toluene was added. Further, 2 cc. of a toluene solution containing 2 mmols of diethylaluminum chloride was added. The reaction temperature and pressure of ethylene were kept at 80° C. and 40 kg./cm.², respectively, and the entire mixture was stirred for 30 minutes. As a result, 23.8 g. of 1,4-hexadiene was obtained. The residue was 0.6 g. Conversion: 100. Selectivity: 96.66.

EXAMPLES 8–11

Into a 100 cc. autoclave, 26 cc. of liquefied butadiene, 20 cc. of toluene and 0.5 mmol of the following iron complexes prepared by processes similar to the one in Example 3 in the presence of the corresponding α-olefins were charged. Then, 2 cc. of a toluene solution containing 2 mmols of diethylaluminum chloride was added. While the reaction temperature and pressure of ethylene were kept at 80° C. and 40 kg./cm.², respectively, the entire mixtures were stirred for 30 minutes to obtain results shown in the following table.

| Example | | 1,4-hexadiene (g.) | Residue (g.) | Conversion (mol) percent | Selectivity (mol) percent |
|---|---|---|---|---|---|
| 8 | Fe[(P—CH₃C₆H₄)₂PCH₂CH₂P(P—CH₃C₆H₄)₂]₂·C₂H₄ | 20.3 | 0.4 | 84.66 | 97.28 |
| 9 | Fe[(C₆H₅)₂PCH₂CH₂P(C₆H₅)₂]₂·CH₂=CHCH₃ | 19.9 | 0.6 | 84.33 | 95.65 |
| 10 | Fe[(C₆H₅)₂PCH₂CH₂P(C₆H₅)₂]₂·CH₂=CHCH₂CH₂CH₃ | 23.1 | 0.9 | 99.33 | 97.65 |
| 11 | Fe[(C₆H₅)₂PCH₂CH₂P(C₆H₅)₂]₂·CH₂=CH—C₆H₅ | 21.8 | 0.7 | 92.67 | 95.68 |

Confirmation of production of catalysts was carried out as follows:

Fe[(p—CH₃C₆H₄)₂PCH₂CH₂P(p—CH₃C₆H₄)₂]₂·C₂H₄

Element analysis: Calculated values C, 75.02; H, 6.86. Observed values C, 75.03; H, 6.70.

Fe[(C₆H₅)₂PCH₂CH₂P(C₆H₅)₂]₂·CH₂=CHCH₃

Element analysis: Calculated values C, 73.92; H, 6.04. Observed values C, 73.81; H, 6.32.

Fe[(C₆H₅)₂PCH₂CH₂P(C₆H₅)₂]₂·
                      CH₂=CH₂CH₂CH₂CH₃

Element analysis: Calculated values C, 73.42; H, 6.29. Observed values C, 73.71; H, 6.11.

Fe[(C₆H₅)₂PCH₂CH₂P(C₆H₅)₂]₂·CH₂=CH—C₆H₅

Element analysis: Calculated values C, 75.43; H, 5.91. Observed values C, 75.22; H, 5.83.

EXAMPLE 12

Into a 100 cc. autoclave, 20.4 g. (0.3 mol) of isoprene was charged, to which 0.44 g. of $$Fe[(C_6H_5)_2PCH_2CH_2P(C_6H_5)_2]_2 \cdot C_2H_4$$

suspended in 10 cc. of xylene was added. Then 4 cc. (4 mmols) of a xylene solution of $(C_2H_5)_2AlCl$ was added. When, at 80° C. under pressure of ethylene of 40 kg./cm.$^2$, the entire mixture was stirred for 1 hour, 24.90 g. of a mixture of 4-methyl-1,4-hexadiene with 5-methyl-1,4-hexadiene was obtained. The residue was 0.5 g. Conversion: 95.00 (mol) percent. Selectivity: 98.01 (mol) percent.

EXAMPLE 13

To a solution consisting of 0.357 g. of $$Fe[(C_6H_5)_2PCH_2CH_2P(C_6H_5)_2]_2 \cdot C_2H_4$$

and 26 cc. of liquefied butadiene, 16 mmol of $(C_2H_5)_3Al$ was added and the mixed solution was heated to 80° C. and stirred for 6 hours while keeping pressure of ethylene at 40 kg./cm.$^2$. As a result, 7.9 g. of 1,4-hexadiene was obtained, besides which 1.0 g. of 1,5-hexadiene, 1.1 g. of 1,3-hexadiene 0.4 g. of 2,4-hexadiene and 2.7 g. of octadiene were formed.

EXAMPLE 14

(1) Production of $$HFe[(C_6H_4)(C_6H_5)PCH_2CH_2P(C_6H_5)_2]$$
$$[(C_6H_5)_2PCH_2CH_2P(C_6H_5)_2]$$

Into a 100 cc. flask, 1.672 g. (0.0042 mol) of 1,2-bis(diphenylphosphino)ethane, 0.707 g. (0.002 mol) of iron (III) acetylacetonate and 20 cc. of benzene were charged, to which 1.5 cc. of ethoxydiethylaluminum dissolved in 15 cc. of benzene was added dropwise. During dropping the temperature was kept at 5–7° C. After dropping, the mixture was stirred at room temperature for 2 hours and heated at 65° C. for 45 minutes. Benzene was removed under a reduced pressure and the reaction solution was concentrated. When 10 cc. of ether and 70 cc. of n-pentane were added thereto, a brown precipitate was obtained. When this precipitate was recrystallized and purified from a benzenediethyl ether solution, 1.2 g. (70%) of orange brown crystals of $$HFe[(C_6H_4)(C_6H_5)PCH_2CH_2P(C_6H_5)_2]$$
$$[(C_6H_5)_2PCH_2CH_2P(C_6H_5)_2]$$

was obtained. The melting point of the product was 179–180° C.

The product was identified as $$HFe[(C_6H_4)(C_6H_5)PCH_2CH_2P(C_6H_5)_2]$$
$$[(C_6H_5)_2PCH_2CH_2P(C_6H_5)_2]$$

as follows:

Elemental analysis: Calculated values C, 73.24; H, 5.68. Observed values C, 73.20; H, 5.77. Infrared spectrum: 1.893 cm.$^{-1}$ ($\gamma$Fe—H). NMR spectrum: $\tau$24.2 (Fe—H proton).

(2) Production of non-conjugated diene:

Into a 100 cc. autoclave, 30 cc. of toluene, 0.424 g. of $$HFe[(C_6H_4)(C_6H_5)PCH_2CH_2P(C_6H_5)_2]$$
$$[(C_6H_5)_2PCH_2CH_2P(C_6H_5)_2]$$

obtained by the aforementioned process and 26 cc. of liquified butadiene were charged. An ethylene gas was introduced up to a pressure of 40 kg./cm.$^2$ and the entire mixture was stirred at 85° C. for 6 hours. As a result, 2.1 g. of 1,5-hexadiene, 2.4 g. of 1,4-hexadiene, 1.3 g. of 1,3-hexadiene, 1.4 g. of 2,4-hexadiene and 9.1 g. of dienes having 8 carbon atoms were obtained.

EXAMPLES 15–21

In 20 cc. of toluene, 0.98 g. of $$Fe[(C_6H_5)_2PCH_2CH_2P(C_6H_5)_2]_2 \cdot C_2H_4$$

was suspended, to which 2 cc. of the reaction mother liquor obtained by the reaction of Example 1 was added, and the entire mixture was heated at 70° C. for 20 minutes.

The reaction solution was concentrated under a reduced pressure and when diethyl ether was added thereto, 0.734 g. (77%) of $$HFe[(C_6H_4)(C_6H_5)PCH_2CH_2P(C_6H_5)_2]$$
$$[(C_6H_5)_2PCH_2CH_2P(C_6H_5)_2]$$

was obtained.

Into a 100 cc. autoclave, 26 cc. of liquified butadiene was charged, to which 0.424 g. of $$HFe[(C_6H_4)(C_6H_5)PCH_2CH_2P(C_6H_5)_2]$$
$$[(C_6H_5)_2PCH_2CH_2P(C_6H_5)_2]$$

dissolved in 10 cc. of toluene was added. Furthermore Lewis acids shown in the following table dissolved in 2 cc. of toluene were added thereto. The autoclave was heated to predetermined temperatures, pressure of ethylene was kept at 40 kg./cm.$^2$ and stirring was continued to obtain results shown in the following table.

| Ex. | [(HFeC$_6$H$_4$)(C$_6$H$_5$)PCH$_2$CH$_2$P(C$_6$H$_5$)$_2$] [(C$_6$H$_5$)$_2$PCH$_2$CH$_2$P(C$_6$H$_5$)$_2$](mmol) | Lewis acid (mmol) | | Temp. (°C.) | Time (min.) | 1,4-hexa-diene (g.) | Residue (g.) | Conversion (mol percent) | Selectivity (mol percent) |
|---|---|---|---|---|---|---|---|---|---|
| 15 | 0.5 | C$_2$H$_5$AlCl$_2$ | 1.0 | 80 | 8 | 22.8 | 0.6 | 96.19 | 96.20 |
| 16 | 0.5 | (C$_2$H$_5$)$_3$Al$_2$Br$_3$ | 1.0 | 80 | 30 | 18.7 | 0.6 | 82.41 | 96.27 |
| 17 | 0.12 | (C$_2$H$_5$)$_2$AlCl | 4.0 | 80 | 20 | 23.2 | 0.4 | 100 | 97.59 |
| 18 | 0.5 | (C$_2$H$_5$)$_2$AlCl | 2.0 | 50 | 70 | 22.55 | 0.7 | 100 | 95.00 |
| 19 | 0.5 | (C$_2$H$_5$)$_2$AlCl | 1.0 | 50 | 100 | 21.9 | 0.8 | 100 | 95.35 |
| 20 | 0.5 | (nC$_6$H$_{13}$)AlCl$_2$ | 1.0 | 50 | 10 | 20.8 | 0.5 | 90.34 | 96.94 |
| 21 | 0.5 | (nC$_3$H$_7$)$_2$AlCl | 4.0 | 80 | 20 | 23.1 | 0.8 | 100 | 95.59 |

EXAMPLE 22

(1) In 15 cc. of benzene, 0.4 g. of $$Fe[(C_6H_5)_2PCH_2CH_2P(C_6H_5)_2]_2 \cdot C_2H_4$$

was dissolved and the mixed solution was irradiated with a ultraviolet lamp (220 W.) for 3 hours. The reaction solution was concentrated under a reduced pressure and when dethyl ether was added thereto, 0.39 g. (yield: 82%) of crystals of $$HFe[(C_6H_4)(C_6H_5)PCH_2CH_2P(C_6H_5)_2]$$
$$[(C_6H_5)_2PCH_2CH_2P(C_6H_5)_2]$$

was obtained.

(2) Into a 100 cc. autoclave, 10 cc. of toluene, 0.424 g. of $$HFe[(C_6H_4\text{-}P(C_6H_5)CH_2CH_2P(C_6H_5)_2]$$
$$[(C_6H_5)_2PCH_2CH_2P(C_6H_5)_2]$$

obtained by the aforementioned process, 13.0 g. of 2-phenyl-1,3-butadiene and 3 cc. of a toluene solution containing 4 mmols of diethylaluminum chloride were charged, and the mixture was stirred at 80° C. under pressure of ethylene of 40 kg./cm.$^2$ for 1 hour. As a result, 10.3 g. of 4-phenyl-1,4-hexadiene was obtained.

EXAMPLE 23

Reaction of 0.70 g. of iron (III) acetylacetonate with 1.5 cc. of ethoxydiethylaluminum in the presence of 1,2-bis(di-p-tolylphosphino)ethane under the same conditions as described in the Example 14 gave 1.4 g. of the following complex.

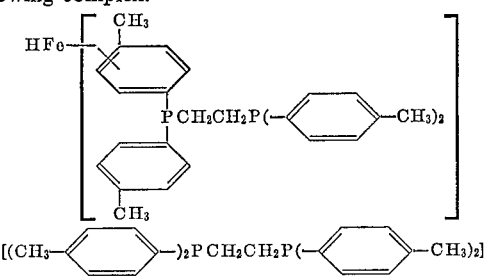

Elemental analysis: analytical values C, 74.71; H, 6.64. Observed values C, 74.98; H, 6.40.

Into a 100 cc. autoclave, 30 cc. of toluene, 0.23 g. of the iron complex obtained by the aforementioned method, 26 cc. of liquified butadiene and 2 mmols of diethylaluminum chloride were charged. The resultant mixture was stirred at 85° C. under ethylene pressure of 40 kg./cm.$^2$ for 1 hour. As a result, 23.1 g. of 1,4-hexadiene was obtained. Conversion: 96.86 (mol) percent. Selectivity: 100 (mol) percent.

What is claimed is:

1. A process for producing non-conjugated dienes wherein ethylene is added to a carbon atom at position 1 or 4 of the starting conjugated diolefinic hydrocarbon, the said process comprising contacting a conjugated diolefinic hydrocarbon represented by the general formula

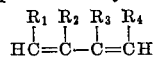

(wherein $R_1$, $R_2$, $R_3$ and $R_4$ stand for a hydrogen atom or a hydrocarbon group having 1 to 6 carbon atoms) with ethylene in the presence of at least one member selected from iron complexes of diphoshine represented by the general formula

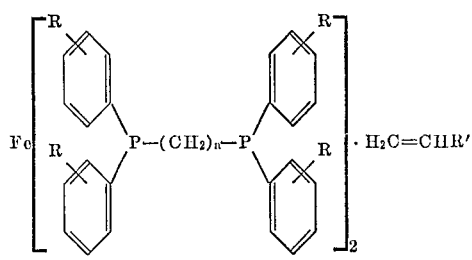

(wherein R stands for a hydrogen atom, a methyl group or an ethyl group $n$ stands for 2 or 3, and R' stands for a hydrogen atom or a hydrocarbon group having 1 to 6 carbon atoms) and iron complexes of diphosphine represented by the general formula

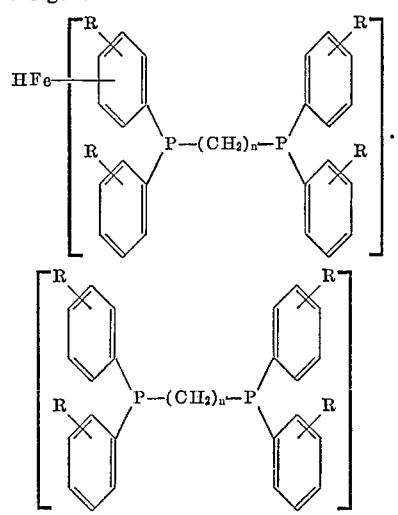

(wherein R and $n$ are the same as defined above) as a catalyst.

2. A process for producing non-conjugated dienes wherein ethylene is added to a carbon atom at position 1 or 4 of the starting conjugated diolefinic hydrocarbon, the said process comprising contacting a conjugated diolefinic hydrocarbon represented by the general formula

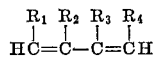

wherein $R_1$, $R_2$, $R_3$ and $R_4$ stand for a hydrogen atom or a hydrocarbon group having 1 to 6 carbon atoms) with ethylene in the presence of a catalyst consisting of (a) at least one member selected from iron complexes of diphosphine represented by the general formula

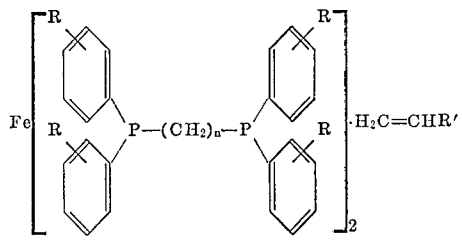

(wherein R stands for a hydrogen atom, a methyl group or an ethyl group, $n$ stands for 2 or 3, and R' stands for a hydrogen atom or a hydrocarbon group having 1 to 6 carbon atoms) and iron complexes of diphosphine represented by the general formula

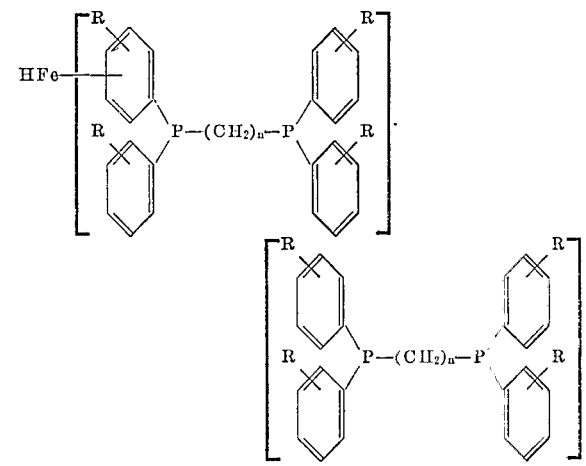

and (b) an organoaluminum compound.

3. A process according to claim 2 wherein molar ratio of an iron complex of diphosphine, the component (a), to an organoaluminum compound, the component (b), is within the range of 1:1 to 1:50.

4. A process according to claim 1 wherein the reaction is carried out under pressure of ethylene.

5. A process according to claim 1 wherein the reaction is carried out in the presence of a chemically inert organic solvent.

6. A process according to claim 1 wherein the said conjugated diolefinic hydrocarbon is 1,3-butadiene.

7. A process according to claim 1 wherein the said conjugated diolefinic hydrocarbon is 2-methyl-1,3-butadiene.

8. A process according to claim 1 wherein the said conjugated diolefinic hydrocarbon is 2,3-dimethyl-1,3-butadiene.

9. A process according to claim 1 wherein the said iron complex of diphosphine as a component of the catalyst is

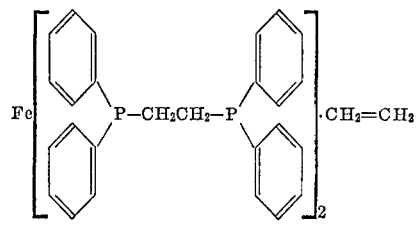

10. A process according to claim 1 wherein the said iron complex of diphosphine as a component of the catalyst is

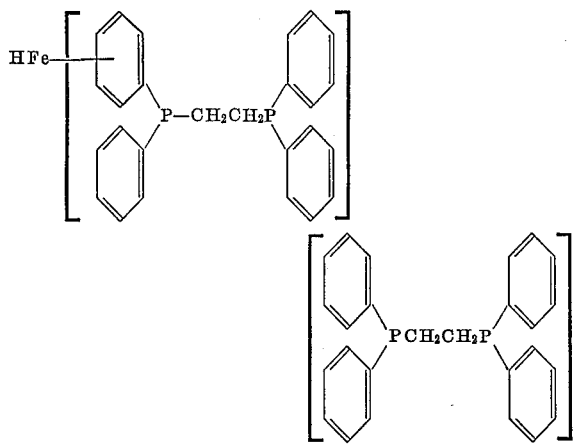

11. A process according to claim 1 wherein the said iron complex of diphosphine as a component of the catalyst is

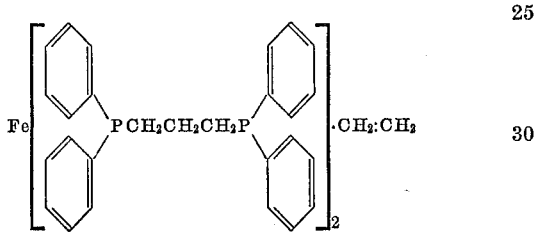

12. A process according to claim 2 wherein the said organoaluminum compound as a component of the catalyst is R'''$_2$AlCl (wherein R''' stands for an alkyl group having 1 to 8 carbon atoms).

13. A process according to claim 2 wherein the said organoaluminum compound as a component of the catalyst is R'''$_3$Al$_2$Cl$_3$ (wherein R''' stands for an alkyl group having 1 to 8 carbon atoms).

14. A process according to claim 2 wherein the said organoaluminum compound as a component of the catalyst is R'''AlCl$_2$ (wherein R''' stands for an alkyl having 1 to 8 carbon atoms).

15. A process according to claim 2 wherein the reaction is carried out under pressure of ethylene.

16. A process according to claim 2 wherein the reaction is carried out in the presence of a chemically inert organic solvent.

17. A process according to claim 2 wherein the said conjugated diolefinic hydrocarbon is 1,3-butadiene.

18. A process according to claim 2 wherein the said conjugated diolefinic hydrocarbon is 2-methyl-1,3-butadiene.

19. A process according to claim 2 wherein the said conjugated diolefinic hydrocarbon is 2,3-dimethyl-1,3-butadiene.

20. A process according to claim 2 wherein the said iron complex of diphosphine as a component of the catalyst is

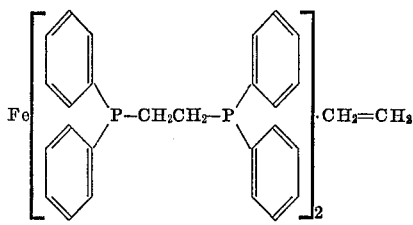

21. A process according to claim 2 wherein the said iron complex of diphosphine as a component of the catalyst is

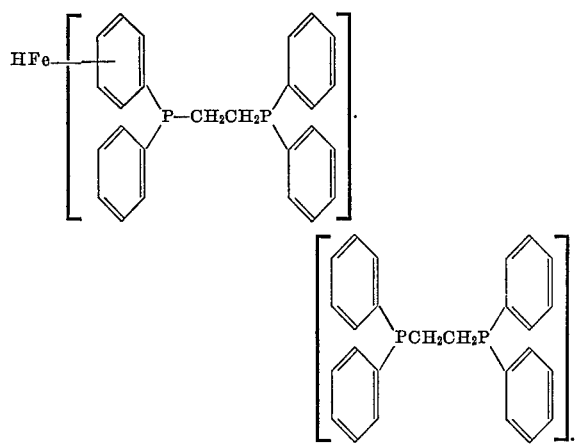

22. A process according to claim 2 wherein the said iron complex of diphosphine as a component of the catalyst is

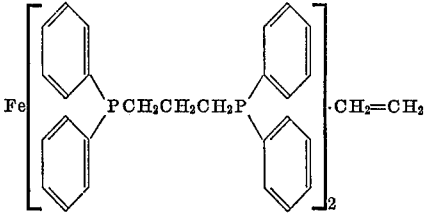

References Cited

FOREIGN PATENTS 1,462,308  11/1966  France.

PAUL M. COUGHLAN, JR., Primary Examiner

U.S. Cl. X.R.

252—431; 260—439